US010958653B1

(12) United States Patent
Miller et al.

(10) Patent No.: US 10,958,653 B1
(45) Date of Patent: Mar. 23, 2021

(54) DYNAMICALLY ADAPTIVE COMPUTER SECURITY PERMISSIONS

(71) Applicant: Amazon Technologies, Inc., Seattle, WA (US)

(72) Inventors: Kevin Christopher Miller, Bainbridge Island, WA (US); Rebecca Claire Weiss, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 15/634,163

(22) Filed: Jun. 27, 2017

(51) Int. Cl.
| | |
|---|---|
| G06F 16/23 | (2019.01) |
| G06F 16/24 | (2019.01) |
| G06F 21/00 | (2013.01) |
| G06F 21/31 | (2013.01) |
| G06F 21/32 | (2013.01) |
| G06F 21/44 | (2013.01) |
| G06F 21/45 | (2013.01) |
| G06F 21/60 | (2013.01) |
| G06F 21/62 | (2013.01) |
| G06F 21/64 | (2013.01) |
| H04L 29/06 | (2006.01) |

(52) U.S. Cl.
CPC .............. *H04L 63/10* (2013.01); *H04L 63/08* (2013.01); *H04L 63/20* (2013.01)

(58) Field of Classification Search
CPC .......... G06F 16/23; G06F 16/24; G06F 21/00; G06F 21/30; G06F 21/31; G06F 21/32; G06F 21/34; G06F 21/44; G06F 21/45; G06F 21/60; G06F 21/62; G06F 21/64; H04L 63/04; H04L 63/08; H04L 63/10; H04L 63/14; H04L 63/20
See application file for complete search history.

(56) References Cited

U.S. PATENT DOCUMENTS

| | | | |
|---|---|---|---|
| 7,496,191 B1 | 2/2009 | Crews et al. | |
| 8,009,013 B1 | 8/2011 | Hirschfeld et al. | |
| 9,619,631 B1 * | 4/2017 | DeHaan | G06F 21/604 |
| 9,853,979 B1 | 12/2017 | Roth et al. | |
| 9,923,927 B1 | 3/2018 | McClintock et al. | |
| 10,380,551 B2 | 8/2019 | Piyush et al. | |
| 10,567,382 B2 | 2/2020 | Dang et al. | |
| 2004/0088576 A1 * | 5/2004 | Foster | G06F 21/33 726/10 |

(Continued)

*Primary Examiner* — Morshed Mehedi
*Assistant Examiner* — Kalish K Bell
(74) *Attorney, Agent, or Firm* — Davis Wright Tremaine LLP

(57) ABSTRACT

A computing resource service provider grants a first set of security permissions to a principal (e.g., a user) which may be used to access a plurality of computing resources. The permissions may be associated with a first security token. The principal may access resources using the first set of security permissions, and a system (e.g., a service provider) may identify a subset of security permissions that are sufficient to provide access to the computing resources accessed by the principal using the first set of permissions. The subset may be associated with the principal. In some cases, the principal operating under the subset of permissions may be denied access to a computing resource and may be granted access to the computing resource by operating under the first set of permissions.

20 Claims, 9 Drawing Sheets

(56) References Cited

U.S. PATENT DOCUMENTS

| | | | |
|---|---|---|---|
| 2006/0206931 A1* | 9/2006 | Dillaway | G06F 21/6218 726/9 |
| 2010/0002248 A1 | 1/2010 | Nuggehalli et al. | |
| 2016/0315941 A1 | 10/2016 | Dang et al. | |
| 2017/0041296 A1 | 2/2017 | Ford et al. | |

* cited by examiner

DYNAMICALLY ADAPTIVE COMPUTER SECURITY PERMISSIONS

BACKGROUND

Security policies are often based on the concept of least privilege. Least privilege is directed to a client having the minimal access permissions necessary to accomplish required actions and nothing more. Any permissions that have been granted that are not needed to perform a correct function can be abused and or exploited and therefore should not be present. For example, a grant of too few permissions to a client charged with maintenance of a web server may prevent the client from performing essential functions, such as a server restart upon crash. In another example, a grant of too many permissions may allow a client charged with maintenance to make changes that may benefit the web server but break supporting systems, such as a change of static IP address. These additional permissions increase risk if the client's credentials are stolen or used improperly while providing no value.

However, implementing least privilege can be difficult. Client capabilities may not match authorized actions. Performing actions on a first resource may also require permissions to access a second or third resource. For example, a virtual machine may have access to block storage. A system charged with maintenance of the virtual machine may also need permission to clone and attach the block storage. However, in other cases, it may only be believed that access to a secondary resource is necessary, when it is not. Furthermore, client capabilities are not always static. Clients can become more capable or efficient over time, which may include a need for revisiting the security policies for each client. While various techniques have been employed to effectively prepare privilege policies, due to the complexity of the actions, the employed techniques are of varied success.

BRIEF DESCRIPTION OF THE DRAWINGS

Various techniques will be described with reference to the drawings, in which.

DETAILED DESCRIPTION

Figure 1:
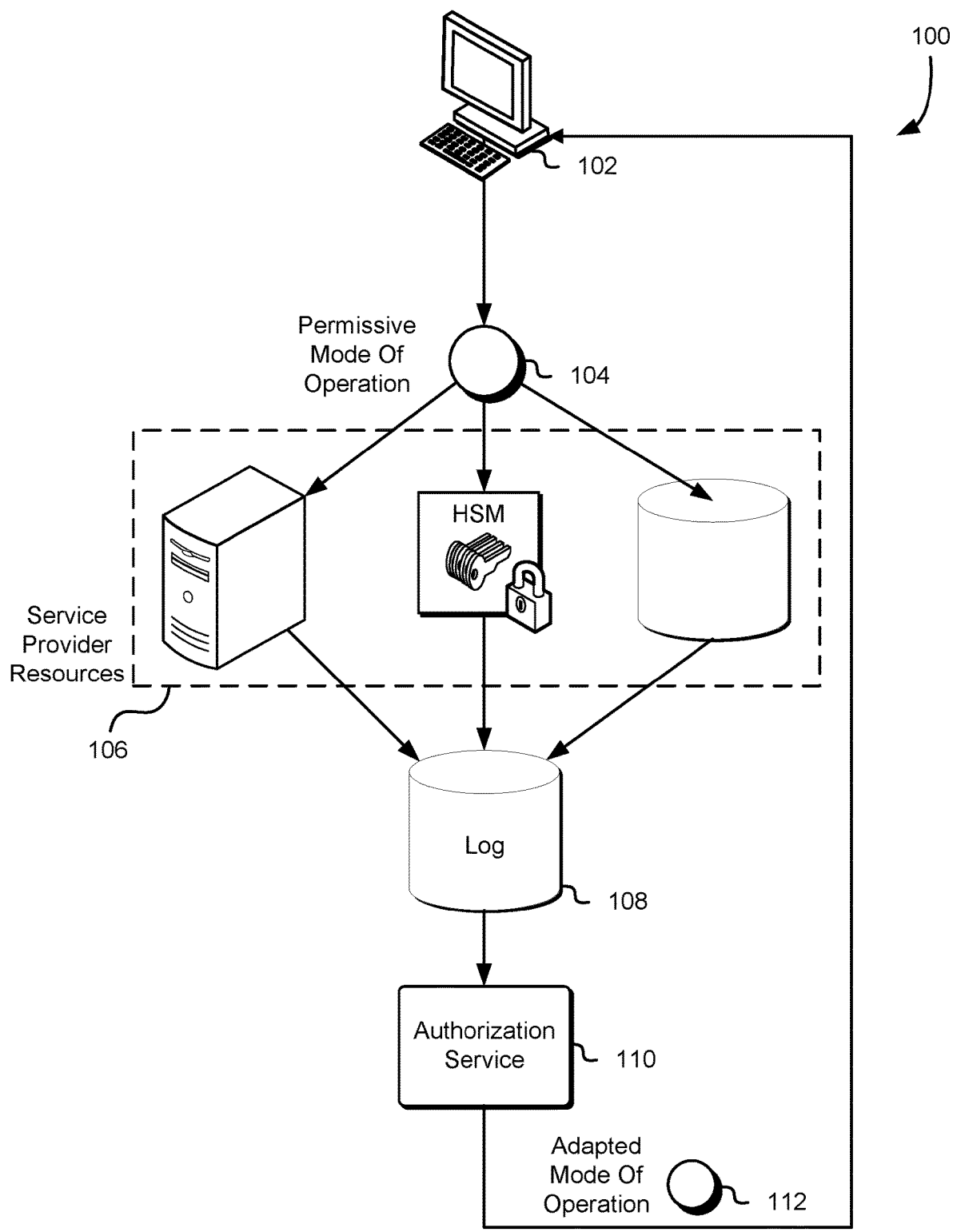
FIG. 1 illustrates an environment in which various embodiments can be implemented.

A computing environment is utilized to dynamically adapt a user's security permissions and apply principles of least privilege. In the context of computer security, principles of least privilege refers to providing a user with the minimal access permissions necessary to accomplish required actions. However, applying principles of least privilege are often difficult, at least in part because determining the minimal access permissions necessary for a user to accomplish tasks may be difficult to ascertain. Computing environments in accordance with this disclosure are used to determine and adapt security permissions for a user that are in accordance with the principles of least privilege. In this way, a computing environment such as a network benefits from improved security such that computing resources of the computing environment are not accessible by users unless necessary. This reduces the risk and/or impact of malicious entities that attempt to gain access to computing resources of the computing environment for illegitimate purposes.

In some examples, a computing environment may include a client and a computing resource service provider. The client may, via a client computing device, communicate with the computing resource service provider via a network. The computing resource service provider may be usable to access computing resources via web application programming interface (API). Computing resources of the service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more.

In some cases, the client utilizes a security token to gain access to one or more computing resources hosted by the computing resource service provider. The client obtains the security token from a security service by authenticating the client's identity using various cryptographic techniques. The security token is usable to obtain access to computing resources of a computing resource service provider. In general, some service providers will deny access to a requested computing resource unless the requestor provides security credentials (such as a security token) that grant access to the computing resource. Accordingly, access to a computing resource may be contingent upon having a security permission that grants access to the resource. A security token may encode or be usable to obtain (e.g., from a policy management service) one or more security permissions that grant or deny access to computing resources. A security token may encode validity information that indicates a time period during which the security token is valid (e.g., when the security token is operable to grant access to computing resources). The validity information may be an expiration time after which the security token is invalid, a time range in which the token is valid (e.g., between a start time and an end time), a certain number of times the token may be used, and so on.

A security token may furthermore include an indication of a mode of operation. A mode of operation may be associated with a set of security permissions, may be used by authorization and/or authentication services to determine whether access to a computing resource should be granted, and may be used to determine whether additional operations such as logging should be performed. In some systems, at least two modes of operation may be used: a permissive mode of operation may be utilized as part of a process to dynamically detect and adapt privileges for a user; and an adapted mode of operation derived from a baselining period. In some embodiments, an adapted mode of operation includes a subset of the set of permissions associated with permissive mode. It should be noted that the subset described above does not necessarily denote a proper subset—in other words, in some embodiments, the adapted mode of operations and permissive mode of operation may include the same set of permissions. The mode of operation may be encoded in any suitable format—as a flag, bit of a bitmask, Boolean value (e.g., TRUE or FALSE), an enumerated data type, and the like.

Access to computing resources of a computing resource service provider may be contingent upon a requestor of the resource providing sufficient security permissions to access the computing resources. In some embodiments, a client issues a request to access one or more computing resources and, as part of the request, include a security token associated with a set of security permissions that grant access to the requested computing resources. An authorization service may identify a list of computing resources that may be accessed as part of the request, identify the security permissions included as part of the request, and determine for each computing resource that may be accessed as part of the request whether there exists a security permission that grants access to the computing resource. In some embodiments, the authorization service may also verify that there is not an explicit permission denying access to the computing resource.

As a result of determining that a requestor is authorized to access a computing resource, the request may be fulfilled. For example, a file may be retrieved and transmitted to the requestor as part of a response to the request; data may be encrypted using a cryptographic key and the encrypted output returned to the requestor; computing resources may be reserved for use by the requestor; and more. In some embodiments, when access to the resource is granted, a system (e.g., the component granting access to the resource) identifies the mode of operation associated with the access of the resource and may perform one or more operations as a result of the mode of operation. The mode of operation may be indicated in a security token provided as part of a request to access a resource. In some embodiments, if a permissive mode of operation is detected, the system determines which permissions associated with the security token are necessary and/or sufficient to access the computing resource and logs information regarding the principal, the computing resource accessed, the request, the security permissions necessary and/or sufficient to access the computing resource, and the mode of operation. The information may be stored in a backend database or other suitable logging system, such as a database.

In some embodiments, a logging component of a computing resource service provider may monitor API calls made to the service and/or resource provider and record request metadata. As requests are made to the provider—for example, via API calls—the logging component may record that the request was issued as well as how the result was processed. For example, in the case where the request was successfully fulfilled, the system may record metadata that indicates the API call succeeded, computing resources accessed as part of fulfillment of the request, security permissions exercised in connection with accessing the computing resource, and the like. As a second example, if a request was not successfully fulfilled, the logging system may record an error code, one or more computing resources for which access was denied based on the security permissions provided, and the like. The logging system may be implemented at least in part using structured storage such as a database from which the logged metadata may be retrieved by a system administrator, a user (e.g., to determine what permissions were exercised as part of performing a task), and more. The request metadata may be recorded in a data store 108.

In some embodiments, the system logs the activities of the client. For example, metadata may be recorded when the client uses a security token indicating a permissive mode of operation to access computing resources. The permissive security token may be used to generate a baseline of security permissions that the client may utilize, for example as an employee of an organization. The client's activities may be recorded over a fixed and/or predetermined period of time, after which the security token expires, indicating the end of the baselining period. Once the baselining period has ended, a component of the service provider (e.g., the authorization service) may obtain the metadata collected during the baselining period and determine which computing resources were actually accessed by the client and which security permissions were necessary and/or sufficient to access those resources.

A second security token may be generated having security with permissions sufficient to access at least some of the computing resources accessed by the client during the baselining period by obtaining the recorded metadata associated with the client's activities and mapping those activities to permissions using a set of rules. For each resource accessed by the client using the first security token in permissive mode of operation, metadata may be recorded indicating one or more security permissions. A dynamically adaptive permissions process may be used to generate a second security token that includes at least those security permissions exercised during the baseline period such that the client may use the second security token to access the same computing resources that the client accessed during the baselining period. In some embodiments, the client may perform an operation during the baselining period and the second security token may include permissions that grant access to perform the operation as well as other related operations. For example, as part of the baselining period, the client may issue an API call to perform an encryption operation using a security module.

After the baselining period has completed, the second security token may include or otherwise be associated with security permissions that grants access to use any security modules of the service and/or resource provider to perform any cryptographic operation supported by the security modules (e.g., encryption, as well as decryption, generating digital signatures, verifying digital signatures, and more). Of course, the breadth of the security permissions granted may be scoped in various ways. As a second example, if the client accesses a storage object during the baselining period, the dynamically adaptive permissions generated may include security permission to access the storage container that includes the storage object accessed by the client during the baselining period. Similarly, in a file system, if the client reads a file, the adaptive permissions may grant read-only access to the accessed file as well as other files in the same directory. Of course, other embodiments may grant other rights with respect to performing other operations (e.g., modifying and deleting the file), accessing subfolders, parent folders, and so on. In general, accessing a computing resource during the baselining privilege may result in the second security token generated by the dynamically least adaptive process having security permissions that are sufficient to access the computing resource as well other computing resources associated with the accessed resource.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure can be practiced. In an embodiment, the environment 100 includes: a client computing device 102; a security token 104; one or more computing resources 106; data store 108; and an authorization service 110 that provides a second security token 112. The environment 100 illustrates an example in which a client's access patterns may be used to dynamically adapt the user's security permissions.

The client computing device 102 may be a client of a service that provides access to computing resources. In some embodiments, the computing resources are accessed via application programming interface (API) calls which may be routed over a network to a service provider. The client computing device 102 may be an entity operable to access services, computing resources, etc., of a computing environment. The client 102 may be operable to request and receive security credentials such as a security token, request and receive computing resources in connection with a security credential, and the like. In some embodiments, the client 102 may utilize one or more interfaces to interact with a distributed computing service.

In some embodiments, the client 102 utilizes a security token 104 to gain access to one or more computing resources of a service such as the computing resources 106 shown in FIG. 1. The client may obtain the security token 104 from a security module (not shown in FIG. 1) by authenticating the client's identity using various cryptographic techniques. For example, the client may present a password to the security module which the security module may verify either directly or indirectly (e.g., by providing the password to a credential management service that securely stores password information).

The security token 104 shown in FIG. 1 may be usable to obtain access to computing resources of a computing resource service provider. In general, some resource providers will deny access to a requested computing resource unless the requestor provides security credentials (such as a security token) that grant access to the computing resource. Said another way, access to a computing resource may be contingent upon having a security permission that grants access to the resource. A security token 104 may encode one or more security permissions that grant or deny access to computing resources. A security permission may be associated with an identity (such as a user) or a resource. These may be referred to, respectively, as identity-based permissions and resource-based permissions. An identity-based permission may be used to grant a principal (e.g., a user) access to a computing resource. Resource-based permissions are associated with a computing resource and may specify what actions a principal may perform in connection with the resource. For example, a security permission may grant access to a particular storage container (e.g., a directory of a network storage device); a security permission may also deny access to certain resources (e.g., an administrator may deny access to particular files or subdirectories of the directory). A security token 104 may be associated to one or more principals. Examples of principals include user accounts, roles, and groups. A user account may be an identity within a computing environment that is uniquely associated with an underlying user, such as a human customer that accesses the service using a computing device. A role may be an identity within a computing environment that is not necessarily uniquely associated with an underlying user or identity and may be assumable by anyone that has a permission to assume the role. A group may be an aggregation of one or more users and/or roles. A security token 104 may encode validity information that indicates a time period during which the security token is valid (e.g., when the security token is operable to grant access to computing resources). The validity information may be an expiration time after which the security token is invalid, a time range in which the token is valid (e.g., between a start time and an end time), a certain number of times the token may be used, and so on.

In some embodiments, the security token 104 may include an indication of a mode of operation. A mode of operation may be associated with a set of security permissions, may be used by authorization and/or authentication services to determine whether access to a computing resource should be granted, and may be used to determine whether additional operations such as logging should be performed. A mode of operation may be indicated in a security token such as the security token 104 shown in FIG. 1. In some embodiments, a permissive mode of operation indicates a set of permissions that are granted as part of a process to dynamically detect and adapt privileges for a user. In some embodiments, an adapted mode of operation includes a subset of the set of permissions associated with permissive mode. It should be noted that the subset described above does not necessarily denote a proper subset—in other words, in some embodiments, the adapted mode of operations and permissive mode of operation may include the same set of permissions. The mode of operation may be encoded in any suitable format—as a flag, bit of a bitmask, Boolean value (e.g., TRUE or FALSE), an enumerated data type, and the like.

In some embodiments, the client 102 obtains access to a set of computing resources 106. The computing resources may be resources of a computing resource service provider in a distributed computing environment. For example, storage, compute, and cryptography services can be resources and/or services provided in the context of a distributed computing environment. The resources may be accessed via API requests to a service frontend. For example, a first API call may be used to launch a virtual machine instance on a computer server of the distributed computing environment. The virtual machine instance may be used to perform computational tasks that are further provided by the requestor. As a second example, a second API call may be used to encrypt data using a cryptographic key that is securely stored within a security module such as a hardware security module (HSM)—secure storage in this context may refer to the cryptographic keys being programmatically unexportable from the security module. As a third example, an API call may be used to store a file within a storage system of the distributed computing environment.

Access to the computing resources 106 may be contingent upon a requestor of the resource providing sufficient security permissions to access the computing resources. In some embodiments, a client 102 may issue a request to access one or more computing resources 106 and, as part of the request, include a security token 104 including a set of security permissions that grant access to the requested computing resources 106. An authorization service may identify a list of computing resources that may be accessed as part of the request, identify the security permissions included as part of the request, and determine for each computing resource that may be accessed as part of the request whether there exists a security permission that grants access to the computing resource. In some embodiments, the authorization service may also verify that there is not an explicit permission denying access to the computing resource.

Upon determining that a requestor is authorized to access a computing resource, the request may be fulfilled. For example, a file may be retrieved and transmitted to the requestor as part of a response to the request; data may be encrypted using a cryptographic key and the encrypted output returned to the requestor; computing resources may be reserved for use by the requestor; and more. In some embodiments, when access to the resource is granted, a system (e.g., the component granting access to the resource) identifies the mode of operation associated with the access of the resource and may perform one or more operations as a result of the mode of operation. The mode of operation may be indicated in a security token provided as part of a request to access a resource. In some embodiments, if a permissive mode of operation is detected, the system determines which permissions associated with the security token are necessary and/or sufficient to access the computing resource and logs information regarding the principal, the computing resource accessed, the request, the security permissions necessary and/or sufficient to access the computing resource, and the mode of operation. The information may be stored in a backend database or other suitable logging system, such as a database.

In some embodiments, a logging component of a computing resource service provider may monitor API calls made to the service and/or resource provider and record request metadata. As requests are made to the provider—for example, via API calls—the logging component may record that the request was issued as well as how the result was processed. For example, in the case where the request was successfully fulfilled, the system may record metadata that indicates the API call succeeded, computing resources accessed as part of fulfillment of the request, security permissions exercised in connection with accessing the computing resource, and the like. As a second example, if a request was not successfully fulfilled, the logging system may record an error code, one or more computing resources for which access was denied based on the security permissions provided, and the like. The logging system may be implemented at least in part using structured storage such as a database from which the logged metadata may be retrieved by a system administrator, a user (e.g., to determine what permissions were exercised as part of performing a task), and more. The request metadata may be recorded in a data store 108.

In some embodiments, the system logs the activities of the client 102. More specifically, metadata may be recorded when the client 102 uses a security token 104 indicating a permissive mode of operation to access computing resources 106. In some embodiments, the permissive security token 104 may be used to generate a baseline of security permissions that the client 102 may utilize, for example as an employee of an organization. The client's activities may be recorded over a fixed and/or predetermined period of time, after which the security token 104 expires, indicating the end of the baselining period. Once the baselining period has ended, an authorization service 110 may obtain the metadata collected during the baselining period and determine which computing resources were actually accessed by the client 102 and which security permissions were necessary and/or sufficient to access those resources. Based at least in part on the collected metadata, a second security token 112 may be generated having security permissions sufficient to access at least some of the computing resources accessed by the client 102 during the baselining period. In some embodiments, the second security token 112 may include an indication of a mode of operation different from the mode of operation of the first security token 104 discussed above.

The security permissions associated with the second security token 112 may be derived from the client's activities during the baselining period. For each resource accessed by the client 102 using the first security token 104 in permissive mode of operation, metadata may be recorded indicating one or more security permissions. A dynamically adaptive permissions process may be used to generate a second security token 112 that includes at least those security permissions exercised during the baseline period such that the client 102 may use the second security token 112 to access the same computing resources that the client 102 accessed during the baselining period. In some embodiments, the client 102 may perform an operation during the baselining period and the second security token may include permissions that grant access to perform the operation as well as other related operations. For example, as part of the baselining period, the client 102 may issue an API call to perform an encryption operation using a security module.

After the baselining period has completed, the second security token 112 may include a permission that grants access to use any security modules of the service and/or resource provider to perform any cryptographic operation supported by the security modules (e.g., encryption, as well as decryption, generating digital signatures, verifying digital signatures, and more). Of course, the breadth of the security permissions granted may be scoped in various ways. As a second example, if the client 102 accesses a storage object during the baselining period, the dynamically adaptive permissions generated may include security permission to access the storage container that includes the storage object accessed by the client during the baselining period. Similarly, in a file system, if the client 102 reads a file, the adaptive permissions may grant read-only access to the accessed file as well as other files in the same directory. Of course, other embodiments may grant other rights with respect to performing other operations (e.g., modifying and deleting the file), accessing subfolders, parent folders, and so on. In general, accessing a computing resource during the baselining privilege may result in the second security token 112 generated by the dynamically least adaptive process having security permissions that are sufficient to access the computing resource as well other computing resources associated with the accessed resource based on a hierarchy structure as previously discussed.

In some embodiments, an authorization service 110 may be used to generate a second security token 112 after a baselining period based on the computing resources accessed using the first security token 104. The baselining period may end after a predetermined period of time or the client 102 may indicate an end to the baselining period (e.g., via an API call). The client 102 may obtain tokens from the authentication service or another component suitable for providing security tokens. The client 102 may indicate an adapted mode of operation to obtain the second security token 112.

Figure 2:
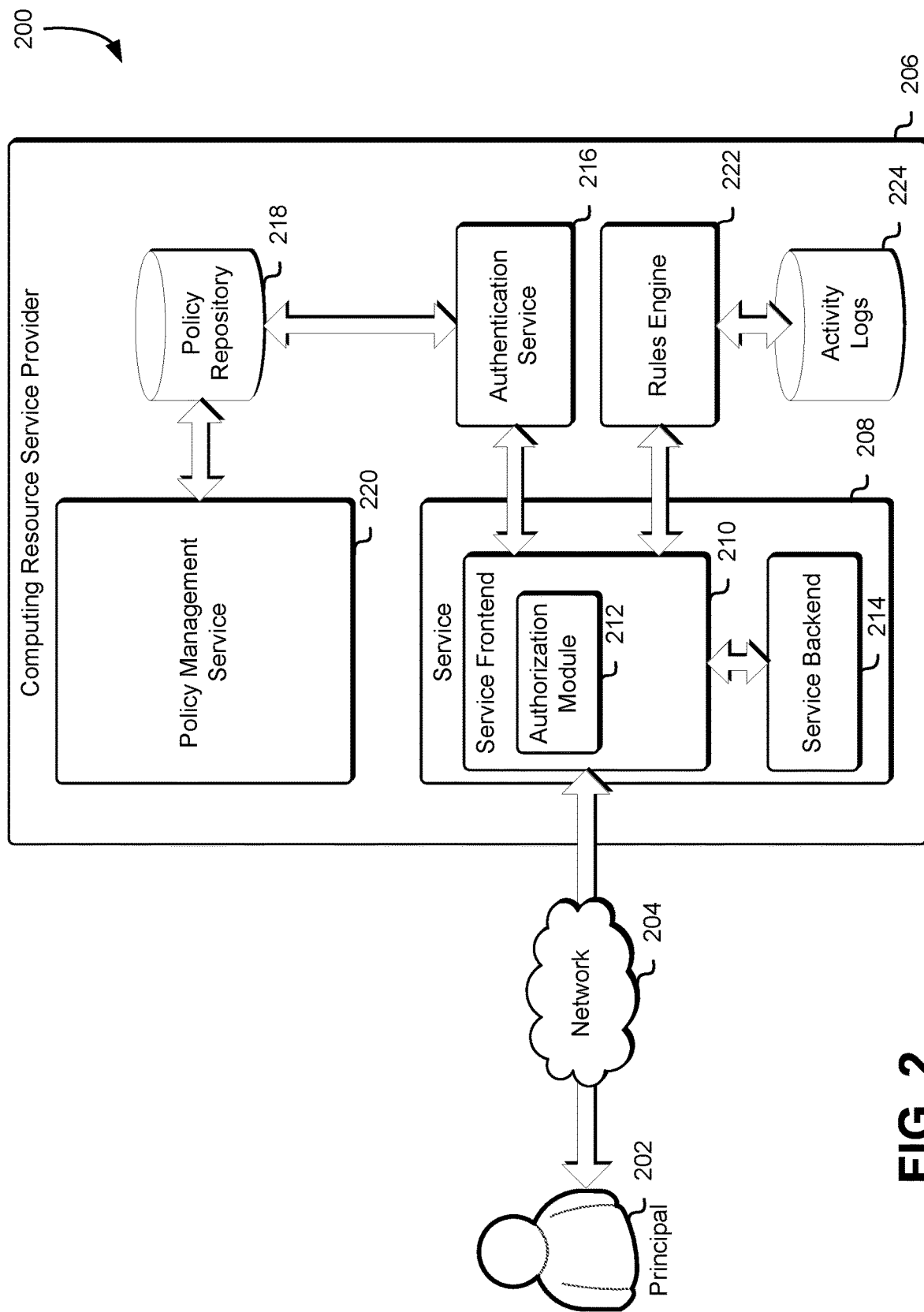
FIG. 2 illustrates an environment in which a computing resource service provider may be utilized to implement various embodiments.

FIG. 2 is an illustrative example of an environment 200 in which a distributed computer system may utilize the various techniques described herein. In an embodiment, a principal 202 may use a computing device to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may, through an associated computing device, issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. In some embodiments, the web server employs techniques described herein synchronously with processing the requests. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220. The query to the policy repository 218 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request).

A policy management service 220 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend 210 may receive a request for access to resources and may generate a query to the policy management service based at least in part on information specified by the request.

The rules engine 222 may be a stand-alone service or component or may be part of a service provider or other entity. In some embodiments, the rules engine 222 accesses a store of activity logs 224 which includes metadata associated with activities of principals interacting with the computing resource service provider such as information regarding the types of request (e.g., API calls from the principal to the service), timestamps of requests, resources accessed as part of the requests, and security permissions necessary and/or sufficient to access those resources. The rules engine 222 may be used to access a principal's previous activities and generate a set of permissions based on those activities.

A principal's activities during a baselining period may be used to generate a policy that corresponds to a minimal set of privileges that the principal is allowed. For example, the minimal set of privileges may be generated based on identifying a computing resource that was accessed by the principal during the baselining period and mapping the activity to a security permission that should be granted. For example, consider the case in which a principal accesses a data object of a data container during the baselining period. In this example, the activity (i.e., accessing the data object) may map to a security permission that grants access only to that data object. In other cases, the activity may map to a security permission that is sufficient to access the resource of the activity, but may also grant access to other resources—continuing with the previous example, access to the data object may be mapped to a security permission that grants access to all data objects within the data container that includes the accessed object. Various other examples exist— access of one data object may map to granting access to all data objects that the principal had—access to during the baselining period. More broadly speaking, access to a resource may be mapped to a set of permissions that grants access to one or more computing resources, where the one or more computing resources may include the accessed resource.

In some cases, access patterns of multiple resources may be used as part of determining the mapping of an accessed resource to a set of permissions. For example, in some cases, accessing only one data object of a data container during a baselining period may map to a policy that only grants security permissions to access that one data object. However, if two or more data objects of the data container are accessed during a baselining period, then the access of the two objects may map to granting access to all objects of the container. Likewise, if a principal accesses one or more resources under a single configuration during the baselining period, that activity may map to a policy that grants permissions only the access resources under that configuration. For example, a principal may initialize and use virtual machine instances to perform tasks, but may do so using a single configuration (e.g., based on CPU, memory, operation system, and other virtual machine settings).

Having obtained any policies applicable to the request, the authentication service 216 may provide an authentication response and, if applicable, the obtained policies back to the service frontend 210. The authentication response may indicate whether the response was successfully authenticated. The service frontend 210 may then check whether the fulfillment of the request for access to the service 208 would comply with the obtained policies using an authorization module 212. Note that, in some embodiments, a policy may be configured such that, whether fulfillment of a request violates the policy depends on whether a violation of a uniqueness constraint has occurred. For instance, some data may be considered to be less sensitive than other data and requests for the less sensitive data may be fulfilled despite a detected violation of a uniqueness constraint while access to the more sensitive data may require that a uniqueness constraint violation not have occurred in connection with a public key specified to be used in authentication of requests. Similar techniques may be employed for other types of computing resources, such as computing devices, storage locations, collections of data, identities, policies, and the like.

An authorization module 212 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

Finally, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Figure 3:
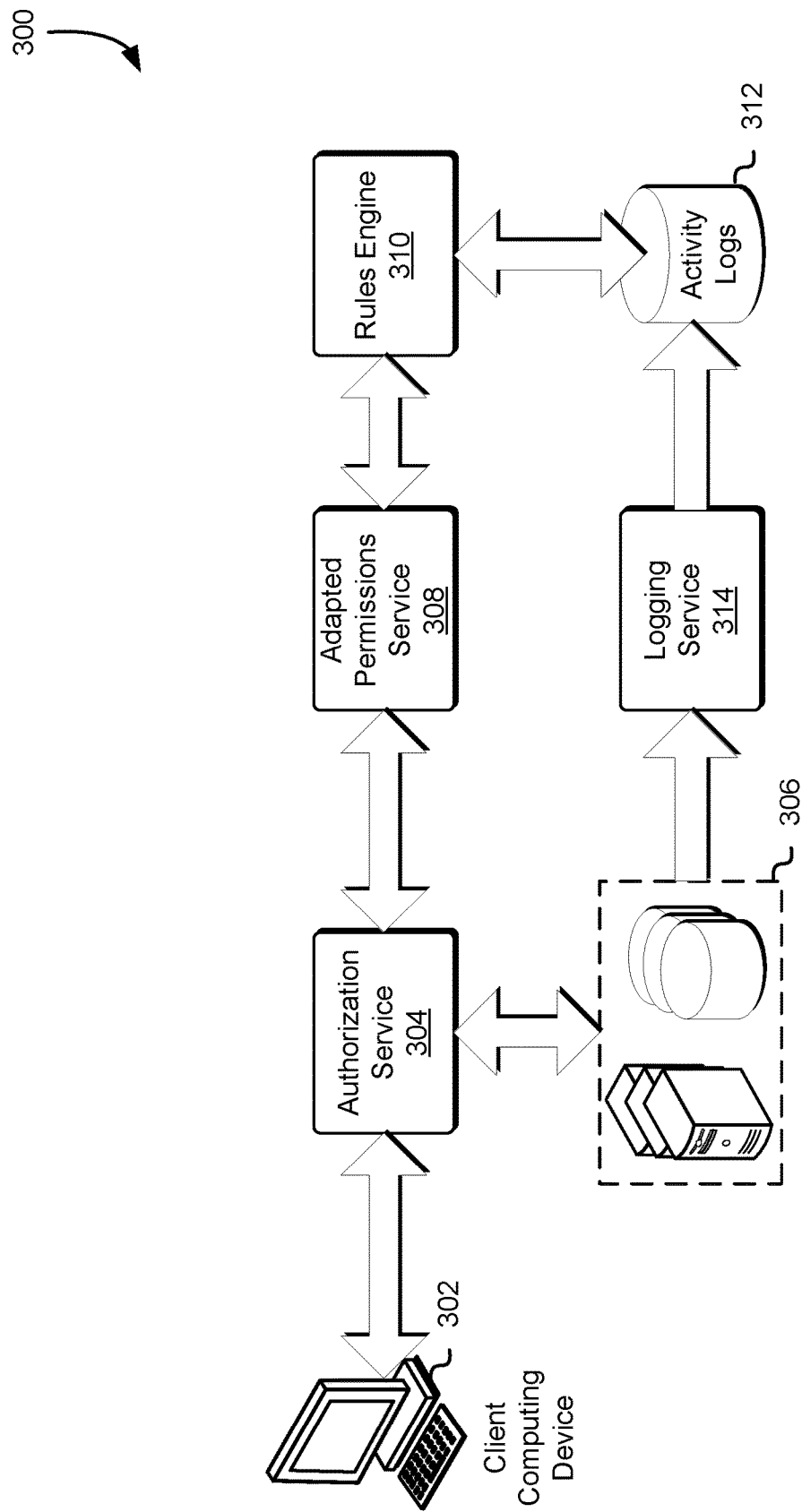
FIG. 3 illustrates an environment in which a policy and/or security permissions are generated based on recorded activities of a principal.

FIG. 3 is an illustrative example of an environment 300 in which various embodiments of the present disclosure can be practiced. In an embodiment, the environment 300 includes: a client computing device 302; an authorization service 304; computing resources 306; an adapted permissions management service 308; a rules engine 310; and a store of activity logs 312. The environment 300 may be used to generate a policy and/or security permissions based on recorded activities of a user.

The client computing device 302 may be in accordance with those described elsewhere in this disclosure. For example, a principal such as the principal described in FIG. 2 may use the client computing device 302 to access a service such as a computing resource service provider in accordance to those described above in connection with FIG. 2. In some embodiments, the environment 300 illustrates a client 302 that makes a request to a computing resource service provider. In some embodiments, the request indicates a mode of operation either explicitly (the mode of operation is encoded as part of the request, perhaps as a parameter specified as part of the request) or implicitly (e.g., the mode of operation is specified by the client as part of establishing a session with the service and applies to requests made as part of the session).

In some embodiments, the client 302 sends a request (e.g., an API call) to a computing resource service provider, the request indicating an adapted mode of operation. The request may be received by the service frontend and routed to an authorization service 304 to determine whether to authorize access to one or more computing resource 306 as part of fulfillment of the request. In some embodiments, the authorization service 304 may identify that an adapted mode of operation is associated with the request (e.g., via a flag specified as part of the request) and transmit, to the adapted permissions management service 308, an identifier associated with the principal (i.e., the requestor), and receive, from the adapted permissions management service 308, a policy that indicates a set of permissions corresponding with the principal in an adapted mode of operation.

The authorization service 304 may provide the principal's identity or an identifier associated with the principal to the adapted permissions management service 308. The authorization service 304 may be in accordance with the authorization module described above in connection with FIG. 2. The adapted permissions management service 308 may be configured to receive a principal's identifier and provide a policy corresponding to the principal in an adapted mode of operation. The adapted permissions management service 308 may, more generally, be configured to receive information regarding a principal, an action or set of actions, etc., and provide a policy that is associated with the received information. The policy may be a minimally permissive policy such that the policy corresponds to the minimal set of permissions that should be granted based on the received information. The adapted permissions management service 308 may provide the rules engine 310 with a principal, a request, one or more actions, etc., and the rules engine 310 may provide the adapted permissions management service 308 with a set of permissions that correspond to a set of permissions that may be granted for the particular context. The adapted permissions management service 308 may be used in various functions. The adapted permissions management service 308 may be used to obtain a policy associated with a principal in a mode of operation. The adapted permissions management service 308 may be used to obtain a policy associated with a client API request. The adapted permissions management service 308 may be used to obtain a policy associated with one or more actions associated using the rules engine 310.

In some embodiments, a rules engine 310 may be used to associate a principal with one or more security permissions. The rules engine 310 may: receive an identifier associated with a principal from the adapted permission management service 308; obtain activities from the activity logs 312 associated with the principal; select one or more applicable rules that map the activities to a set of permissions; and determine, based on the mapping, a policy that is applicable to the principal. An action may refer to an API call (e.g., an internal API call that is used by a component of the computing resource service provider in connection with fulfilling a client request). Actions may be activities that were performed by the principal or on behalf of the principal during a permissive mode of operation. As discussed elsewhere in this disclosure, various types of rules may be used to generate various types of mappings. For example, if a principal modifies a data object during a baselining period, an activity log entry is recorded indicating an actor, an activity, a resource, and a mode of operation. In this example, the actor is the principal, the activity is a data modification operation (or a write operation), the resource is the data object, and the mode of operation is a permissive mode of operation (occurring during a baselining period). Continuing with the example, the rules engine may obtain the activity log entry corresponding to the modification of the data object and a corresponding rule that maps access of a data object to one or more security permissions. Various mappings may exist. For example, accessing the data object for write access may map to security permissions that includes both write and read access of the data object. Access of the data object may also grant permissions to read and/or write other data objects in the same data container as the accessed object.

Associating a principal to one or more security permissions may include obtaining actions that the principal performed during a baselining period where the principal accessed resources under a permissive mode of operation. Those activities may be recorded in the activity logs 312 by a logging service 314 when the computing resources 306 are accessed. The actions may be mapped to a set of permissions through an aggregation process. The aggregation of permissions may be a simple union of the permissions or may follow different aggregation rules. For example, if a principal accessed a first data object A of a data container and a second data object B of the same container, a simple union of the permissions may be a set of permissions that grants access to A and B. An aggregation rule may expand permissions granted in such a case so that access of two or more data objects of a data container grants access to all objects of the container.

Figure 4:
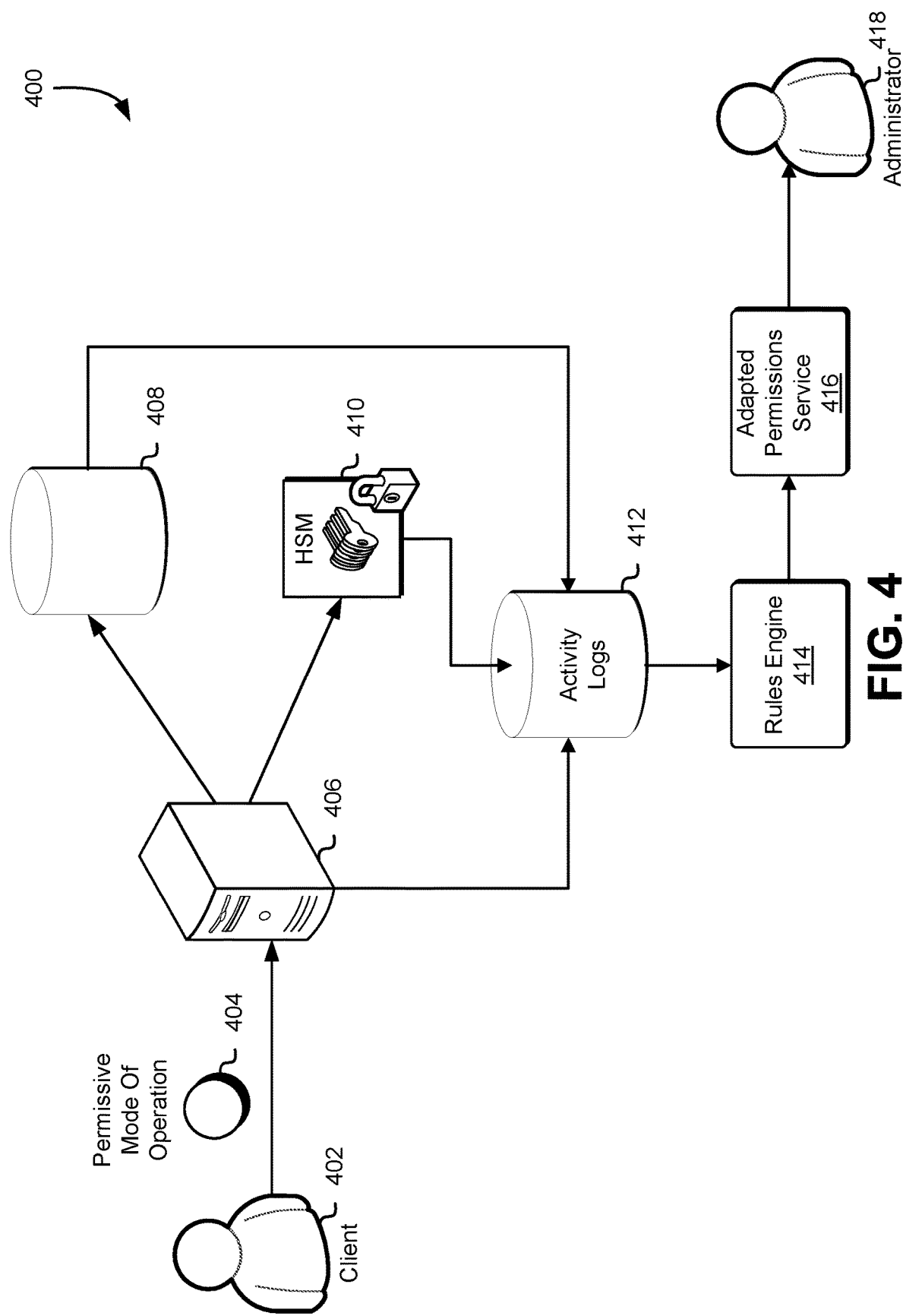
FIG. 4 illustrates an environment in which activities of a principal are recorded and utilized to determine a policy and/or security permissions.

FIG. 4 is an illustrative example of an environment 400 in which various embodiments of the present disclosure can be practiced. In an embodiment, the environment 400 includes: a client 402; a security token 404 that indicates a permissive mode of operation; a computing resource 406 that the client 402 requests access to; additional resources 408 that may be accessed as part of the request; and a storage system 412 that stores activity logs. The environment 400 illustrates an example of multiple computing resources being accessed and logged in connection with a request. In some embodiments, the environment 400 may be implemented in accordance with computing resource service providers described in connection with FIG. 2.

In some embodiments, a client 402 may utilize a client computing device to obtain security credentials indicating a permissive mode of operation. The security credentials may be obtained from a service frontend that is implemented in accordance with FIG. 2. The security credentials may be a security token 404. During a baselining period, the client 402 may request access to a computing resource 406 of a computing resource service provider. The request may be an API call that the client 402 uses to communicate, via a network, with a computing resource service provider that has access to the computing resource 406. The API call may be sent to a computing resource service provider service frontend (not shown in FIG. 4) implemented in accordance with FIG. 2. The service frontend may receive the request and utilize an authentication service to obtained policies applicable to the request. The policy may be determined based at least in part on the mode of operation indicated in the security token 404. For example, a policy associated with the client 402 in a permissive mode of operation may allow fulfillment of a request that accesses the computing resource 406 shown in FIG. 4.

In some cases, a request to access a computing resource 406 may include access to additional computing resources 408 and 410 of the computing resource service provider in conjunction with fulfillment of the request. For example, as part of a request to access a computing resource 406, there may be additional backend computing resource 408 and 410 that are accessed in connection with fulfillment of the request. For example, a request to perform an operation on a virtual machine instance (e.g., the computing resource 406 illustrated in FIG. 4 may be a virtual machine instance) may access a cryptography module (e.g., the computing resource 410 illustrated in FIG. 4) to verify a digital certificate in connection with the requested operation and/or virtual machine instance. Therefore, when a client 402 requests access to a computing resource 406, there may be additional computing resources 408 and 410 that are accessed (e.g., as part of internal API calls between components within the computing resource service provider) that are accessed. Access of these resources may be recorded in a store of activity logs 412 which may record which computing resources were accessed in connection with a request.

In some embodiments, the activity logs 412 may be used to determine a policy associated with an action. For example, in some embodiments, an adaptive permissions service 416, which may be implemented in accordance with embodiments described in connection with FIG. 2, may be configured to determine a policy that is associated with one or more actions. For example, an administrator of a system or network may wish to determine the minimum set of permissions that are required for a particular user to perform a task that utilizes the computing resource 406 shown in FIG. 4. The administrator 418 (e.g., a computing device on behalf of an administrator) may query the adapted permissions service 416 (e.g., using a web API to the computing resource service provider that is routed to the adapted permissions service 416 via a service frontend) with a list of one or more actions. The rules engine may obtain a list of activities from the activity logs 412 that are associated with the action (e.g., in this example, the access of the computing resources 406, 408, and 410) and map the activities to one or more permissions (e.g., in the manner described above in connection with FIGS. 1-2). The rules engine 414 may provide the mapped permissions to the adapted permissions service 416 which may provide the administrator 418 a policy corresponding to the mapped permissions. The administrator 418 may use the policy in various ways, such as by applying the policy to the particular user that is to perform the task that utilizes the computing resource 406 shown in FIG. 4. In this way, embodiments in accordance with this disclosure may improve the computer security of a system—principles of least privilege are applied such that the user is granted access only to the resources that are necessary to complete the task.

Figure 5:
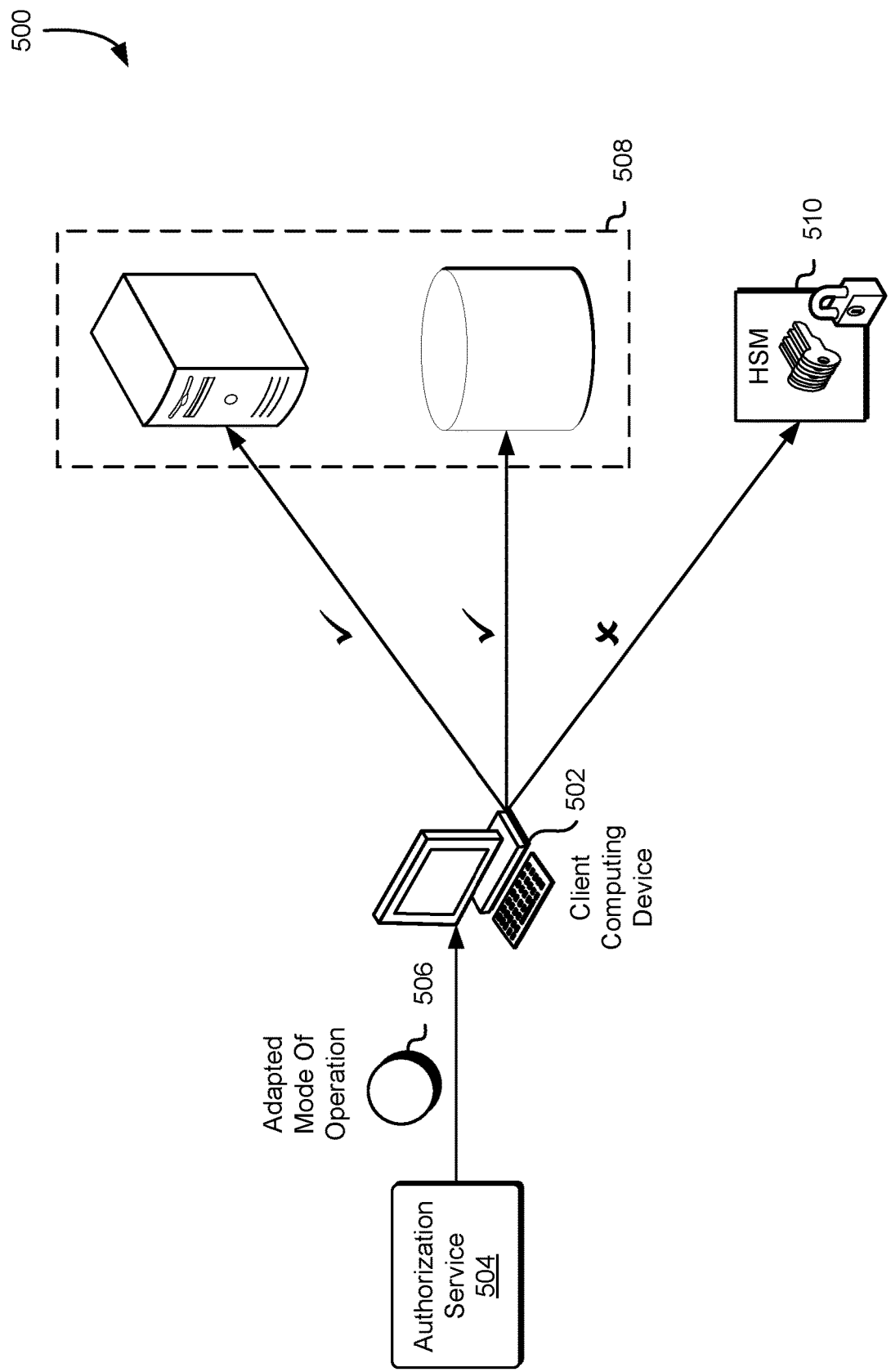
FIG. 5 illustrates an environment in which a principal utilizes a security token indicating a mode of operation to request access to multiple computing resources.

FIG. 5 is an illustrative example of an environment 500 in which various embodiments of the present disclosure can be practiced. In an embodiment, the environment 500 includes: a client computing device 502; an authorization service 504; a security token 506; a first set of computing resources 508; and a second set of computing resources 510. The environment 500 illustrates an example of how access to computing resources of a service provider may be granted or denied based on the security credentials that the client provides.

In some embodiments, a client computing device 502 may be utilized by a client to obtain security credentials from an authorization service 504. The client computing device 502 and authorization service 504 may be in accordance with those described elsewhere in this disclosure. Furthermore, the authorization service 504 may be a component of another service for example, the authorization service 504 may be implemented as a module of a computing resource service provider such as those described in accordance with FIG. 2. The authorization service may be configured to provide security credentials to the client, such as the security token 506 shown in FIG. 5.

In some embodiments, the authorization service 504 is configured to provide security credentials to the client 502. The credentials may be provided to the client in response to a request by the client 502 which may include authentication information such as a password and/or successful verification of a multifactor authentication process. The security credentials may be provided in the form of a security token. In some embodiments, the security token includes a mode of operation. In some embodiments, the client 502 may specify a permissive mode of operation, an adapted mode of operation, etc.

The environment 500 illustrates an example in which a client 502 may have access to some computing resources (e.g., illustrated by the computing resource 510) under one mode of operation but not in another mode of operation. In an embodiment, a client 502 may request security credentials from the authorization service 504. The request may specify an adapted mode of operation, either explicitly (e.g., the mode of operation is a request parameter that is required for fulfillment) or implicitly (e.g., an adapted mode of operation is assumed by default in the absence of additional request information that indicates another mode of operation). The authorization service may provide a security token 506 that indicates an adapted mode of operation (e.g., as a flag encoded in the token) and the client 502 may make requests to access resources of a computing resource service provider using the token.

In some embodiments, whether access to computing resources is granted or denied in an adapted mode of operation may be based on which computing resources were accessed during a permissive mode of operation and rules associated with the access. For example, consider the case where the client 502 previously accessed some computing resources (e.g., computing resources 508 shown in the dotted box of FIG. 5) but not other computing resources (e.g., computing resources 510 outside of the dotted box of FIG. 5) during a permissive mode of operation where the security permissions associated with the permissive mode of operation are sufficient to access the computing resources 508 and 510 shown in FIG. 5. The actions accessing the computing resources 508 shown in the dotted box may be recorded as activity log entries, such as in accordance with FIGS. 2 and 4. The adapted mode of operation may be associated with a different set of resources from the permissive mode of operation. For example, the permissive mode of operations may be associated with a first set of permissions and the adapted mode of operation may be associated with a second set of permissions that is a proper subset of the first set of permissions. The first set of permissions associated with the permissive mode of operation may include the computing resources 508 and 510 shown in FIG. 5. During a baselining period, the client 502 may access some of the computing resources 508 but not other computing resources 510. The actions that the client 502 takes during the baselining period may be stored in an activity log and those activities may be used to determine, based on one or more rules, a set of permissions granting access to computing resources 508 which are associated with the adapted mode of operation for the client 502.

Returning to FIG. 5, the client 502 may obtain a security token 506 indicating an adapted mode of operation and make requests to access computing resources 508 and 510 of a computing resource service provider. While not shown in FIG. 5, the requests may be made in accordance with the environment illustrated in FIG. 2 where the client 502 makes a request over a network to a computing resource service provider's service frontend which routes the request appropriately and may provide access to computing resources accessible through a service backend. The client 502 may present the security token 502 as part of a request to access computing resources. In a first example, the client 502 may request access to a computing resource such as a data object and an authorization service (which may be different from the authorization service shown in FIG. 5 supplying the security token 506 to the client 502) may obtain the security token 506. The authorization service may obtain the token, determine that the token indicates an adapted mode of operation, and request a set of permissions associated with the principal and token, for example, using an adapted permissions service implemented in accordance with FIG. 3. The security permissions may be supplied to the authorization service as a policy. The policy may be generated based on the access patterns (i.e., activities) of the client 502 during a baselining period while operating under an adapted mode of operation which are stored in an activity log, retrieved by a rules engine, and mapped to a set of permissions that is returned by the adapted permissions service to the authorization service as a security policy. The security policy may indicate that some computing resources 508 of a computing resource service provider may be accessed under an adapted mode of operation while other computing resources 510 of the computing resource service provider may be inaccessible under the adapted mode of operation even though those resources may have been accessible under the permissive mode of operation.

It should be noted that in some cases, the first set of permissions and the second set of permissions may have the same access rights (i.e., they are not proper subsets of each other), such as where all resources are accessed during the permissive mode of operation. More generally, though, computing resources accessed during a permissive mode of operation may be mapped, via one or more rules, to one or more permissions that may be granted during an adapted mode of operation.

Figure 6:
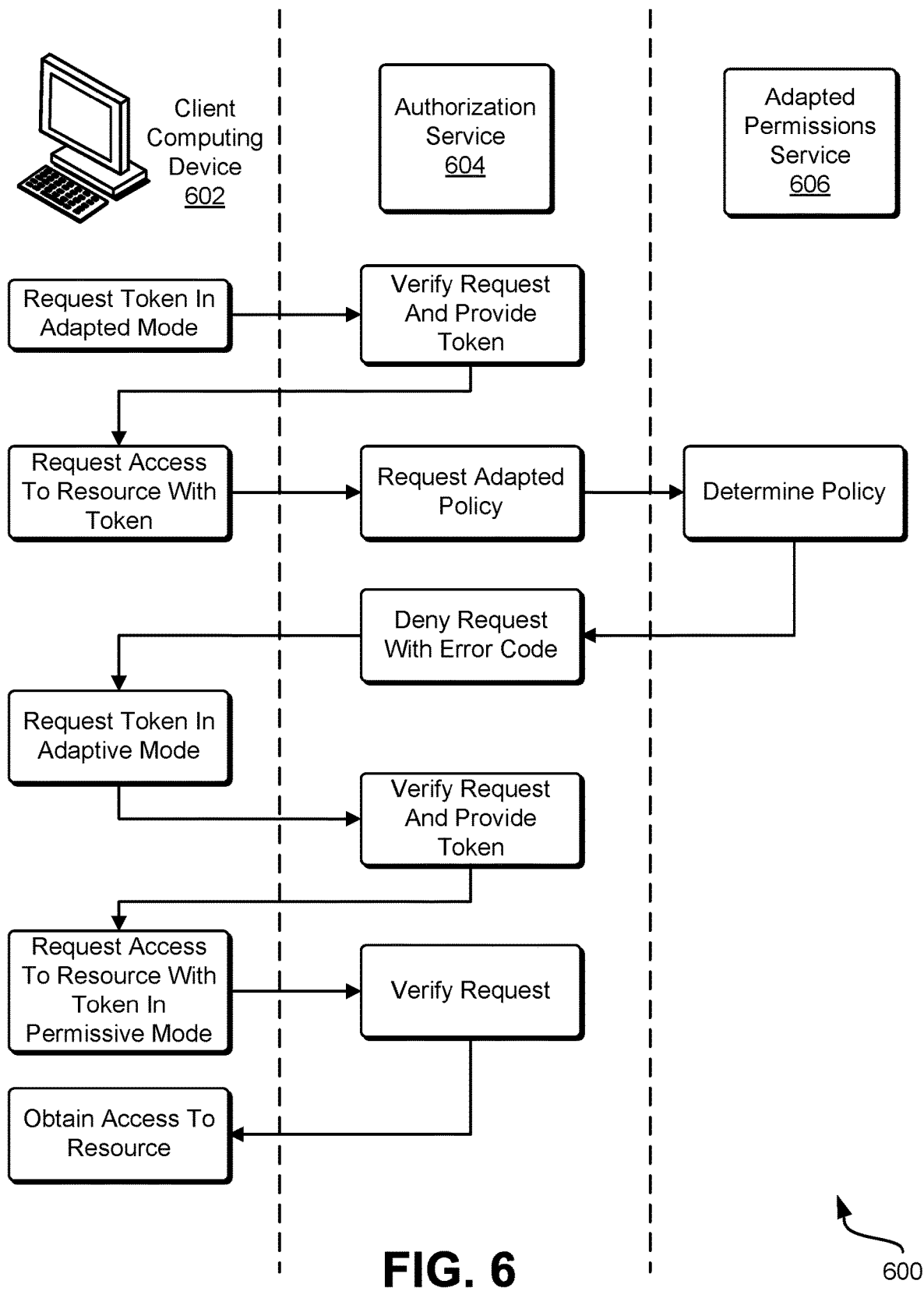
FIG. 6 illustrates a diagram in which a principal utilizes a permissive security token and an adapted security token in connection with obtaining a computing resource.

FIG. 6 is an illustrative example of a diagram 600 in which a client 602 utilizes security tokens to access a computing resource from a computing resource service provider. The diagram 600 includes a client computing device 602; authorization service 604; and adapted permissions service 606. The components shown in FIG. 6 may be implemented in accordance with embodiments described in connection with FIGS. 1-5. The diagram 600 illustrates an example of how security tokens may be sued to access computing resources of a computing resource service provider.

The client computing device 602 may be utilized on behalf of a client to obtain access to computing resources. In some embodiments, the client computing device 602 transmits a request to a computing resource service provider to obtain a security token to access computing resources in an adapted mode of operation. The request may be transmitted via a network to a service frontend of a computing resource service provider that routes the request to an authorization service 604 to perform various authorization related routines. In some embodiments, the authorization service 604 verifies the request and provides a security token that indicates an adapted mode of operation. In some embodiments, the authorization service 604 performs a verification operation that determines that the request should be fulfilled and another component of a computing resource service provider is used to obtain and/or generate the requested security token and transmits the security token to the client computing device to fulfill the request.

The client computer device 602 may receive the adapted security token and transmit a request to access one or more computing resources, the request being associated with the adapted security token. In some embodiments, the security token is transmitted as part of the request. The request may be routed to the authorization service 604 which may detect that the security token indicates an adapted mode of operation and, in response to detecting that the token indicates an adapted mode of operation, provide a client identifier to the adapted permissions service 606. The adapted permissions service 606, in conjunction with a rules engine, may query a database for a set of activities performed by the principal during a baselining period, map those activities to a set of security permissions, and generate a policy from the mapped permissions. This process may be implemented in the manner described elsewhere in this disclosure, such as in the manner described above in connection with FIG. 3. The policy may be returned to the authorization service 604 which may use the policy to determine whether access to the requested computing resource should be granted.

In some embodiments, the policy may indicate that access to the computing resource should not be granted. In such a case, the system making the determination (or another suitable system) may further determine the permissions associated with the client under a permissive mode of operation (e.g., by using a policy management service and/or policy repository implemented in accordance with those described in connection with FIG. 1). In some cases, a computing resource may not be accessible to a principal (e.g., the client) based on the policy associated with the principal operating in an adapted mode of operation but may be accessible to the principal based on the policy associated with the principal operating in a permissive mode of operation. In this case, the client's request may be denied with an error code that indicates that the request was not fulfilled and that it may be possible to fulfill the request under the permissive mode of operation. However, in some embodiments, the response may return an error code that simply indicates that the request was not fulfilled or that access to the requested resource was denied without indicating that changing the mode of operation may grant access to the resource. The indication may be an error code.

The client may receive a response indicating that the request was not fulfilled and that it may be possible to access the resource under a permissive mode of operation. In response, the client may issue a second request, the second request being a request to obtain a security token in permissive mode of operation. The request may be transmitted to the computing resource service provider and a service frontend and/or authorization service may be used to process the request. In some embodiments, fulfillment of the request to obtain credentials associated with the permissive mode of operation may be predicated upon verification of a multi-factor authentication process (e.g., a principal must supply a user account password and a one-time code that is transmitted to a mobile phone associated with the principal) and/or a multiparty authentication process (e.g., a user must have an administrator or manager approve the request). If the conditions for fulfillment of the request are satisfied, the service returns to the client a security token corresponding to a permissive mode of operation. The client may request access to the computing resource with the security token corresponding to the permissive mode of operation. The authorization service may receive the request (e.g., indirectly, via a web API), determine that access should be granted, and fulfill the request by providing access to the computing resource, by performing one or more instructions that utilize the computing resource, etc. In some embodiments, determining to fulfill the request in a permissive mode of operation may not require access to the adapted permissions service—in some embodiments, the request may be fulfilled even under circumstances that render the adapted permissions service unavailable.

Figure 7:
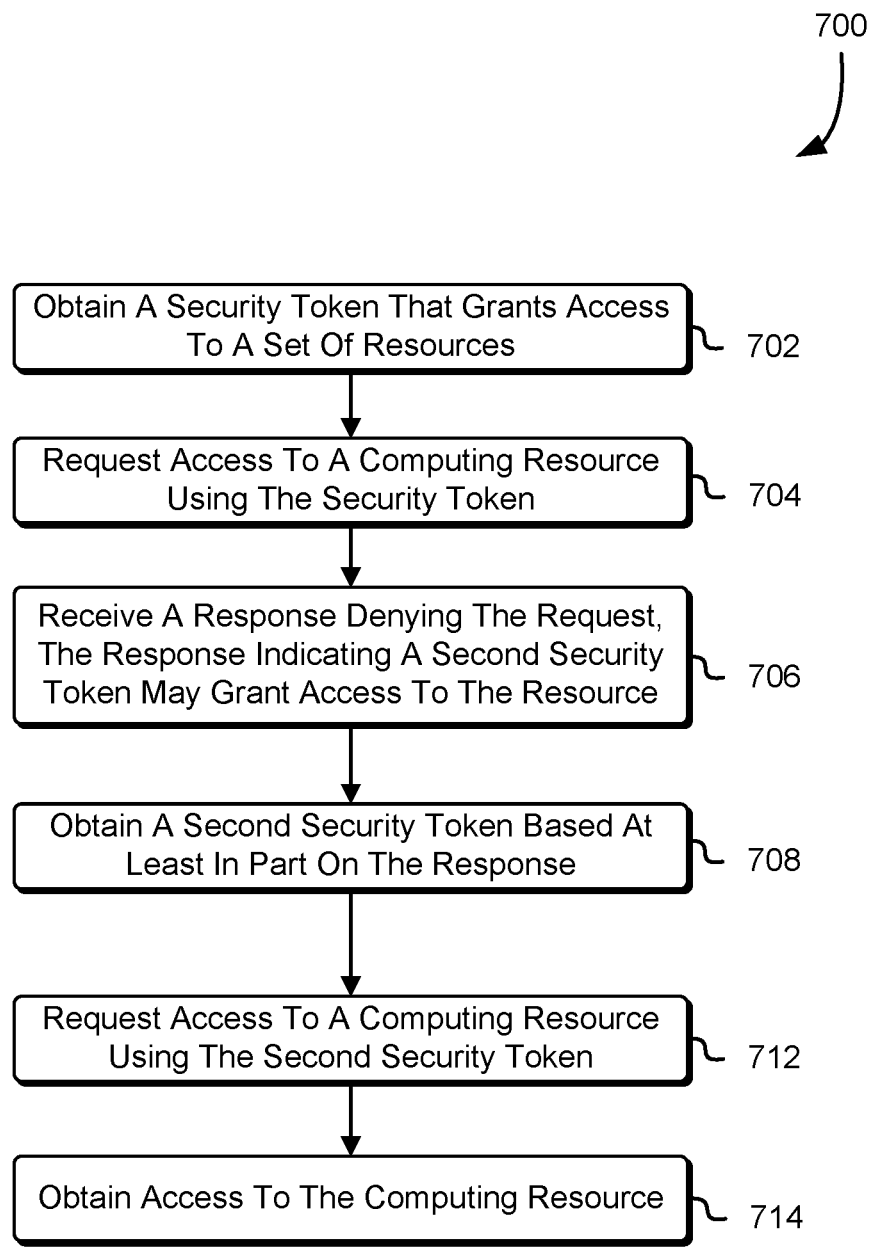
FIG. 7 illustrates a process for obtaining access to one or more computing resources.

FIG. 7 illustrates an example process 700 for obtaining access to one or more computing resources. The computing resources may be backend resources of a computing resource service provider. Access to a computing resource may include receiving the computing resource in a response to the request, may include the utilization of the computing resources to perform a specified task, and more. Examples of a computing resource include: resources for performing computations (e.g., using a virtual machine instance); data storage resources (e.g., network storage); and cryptography-related resources (e.g., secure storage of cryptographic keys and performing cryptographic operations). The process 700 may, for example, be performed at least in part by a client computing device in accordance with embodiments described in connection with other figures of this disclosure. The process 700 may be implemented in accordance with environments and components described elsewhere in this disclosure, such as in accordance with embodiments described in connection with FIGS. 1-6.

A system that implements the process 700 may obtain 702 a first security token that may be used as part of a procedure for gaining access to a set of computing resources. In some embodiments, the set of computing resources may be an empty set—in other words, the first security token may, in some embodiments, grant no access rights. The first security token may indicate a first mode of operation that is encoded as a flag, bitmask, boolean, etc. The system may, after obtaining the first security token, request 704 access to a computing resource. In some embodiments, the request may include the first security token or a reference the first security token. The first security token may be associated with a first set of permissions, the first set of permissions not sufficient to access the requested resource.

In response to the request, the system may receive 706 a response that denies or otherwise indicates that the request was not fulfilled. In some embodiments, the request further includes an indication that a second security token associated with the system may be able to grant access to the computing resource. The system may obtain 708 a second security token by transmitting a request to a computing resource service provider for a security token associated with the system and indicate a permissive mode of operation. In some embodiments, the web API itself may indicate the mode of operation—for example, in some embodiments, there are separate web APIs that a client uses to interact with a computing resource service provider for a security token in a first mode of operation and a security token in a second mode of operation. In some embodiments, the mode of operation may be specified as a parameter of a request that may be used, generally, to obtain security tokens of various modes of operation.

In some embodiments, the second security token may be associated with a second set of permissions where the first set of permissions (i.e., those associated with the first security token) is a proper subset of the second set of permissions, and the second set of permissions includes permissions sufficient to access the computing resource and fulfill the request. The system may request 712 access to the computing resource using the second security token, and the request may be fulfilled by a computing resource service provider. In some embodiments, fulfillment of the request may include obtaining 714 access to the computing resource. In some embodiments, the system may instead receive an indication that the request was successfully fulfilled.

Figure 8:
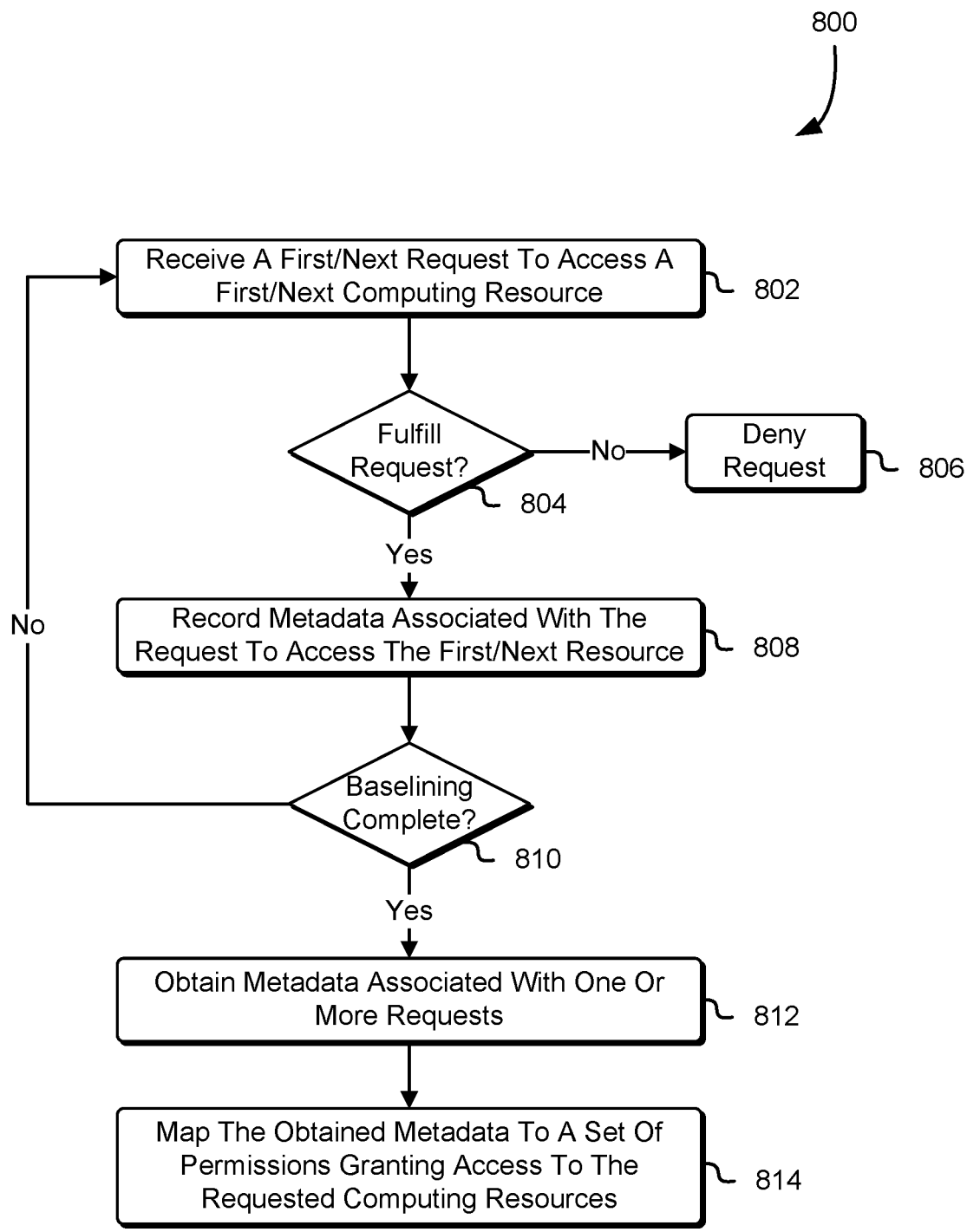
FIG. 8 illustrates a process for determining a set of permissions based on a principal's activities during a baselining period.

FIG. 8 illustrates an example process 800 for generating a security policy associated with an adapted mode of operation. The process 800 may be performed by components of a computing resource service provider in coordination. Various steps of the process may be performed using an authentication service, an adapted permission service, a rules engine, a storage system for activity logs, and more. The process 800 may be implemented in embodiments described in connection with FIGS. 1-7.

In some embodiments, the system may provide a principal with a security token indicating a permissive mode of operation. The system may receive 802 a request to access a computing resource of a computing resource service provider that includes the security token or is otherwise associated with the security token. The system may utilize an authorization service and/or an authentication service to determine whether 804 to fulfill the request. If the requestor is not able to be properly authenticated or does not have sufficient privileges for the request to be fulfilled, the request may be denied 806 by sending a response indicating an error occurred or that the request was not fulfilled. In some embodiments, the request may be dropped such that no response is provided or a timeout error is provided.

If the request is fulfilled, the system may record 808 metadata associated with the request. The metadata may include information such as: an identifier associated with the principal; the timestamp associated with when the request was made; an identifier associated with the request; an identifier associated with the resource; and an indication of the mode of operation. In some embodiments, the metadata is recorded in an activity log implemented as a database. The system may determine 810 whether the baselining is completed. The determination may be made based on various criteria, either alone or in combination. The baselining period may be determined based on a time duration, a number of requests, based on a session, until a certain amount of time has elapsed since the last request, any combination thereof, and more. If the baselining has not completed, the system may continue to receive 802 and process additional requests until the system determines that the baselining period has completed.

After the baselining period has concluded, the system may obtain 812 metadata associated with at least some of the requests made during the baselining period. A rules engine may be used to map the metadata associated with the requests (i.e., activities) to a set of permissions and used to generate a security policy, for example, in the manner described above in connection with FIGS. 1-4. The policy may be associated to the principal and an adapted mode of operation.

In context of this disclosure, the term "proper subset" may be in accordance with principles of set theory—in other words, a first set of permissions "A" that is a proper subset of a second set of permissions "B" necessarily excludes at least one permission of the second set of permissions. An empty set (e.g., a set of permissions that neither grants or denies access to any computing resources) may be a set of permissions and/or a proper subset of permissions.

Figure 9:
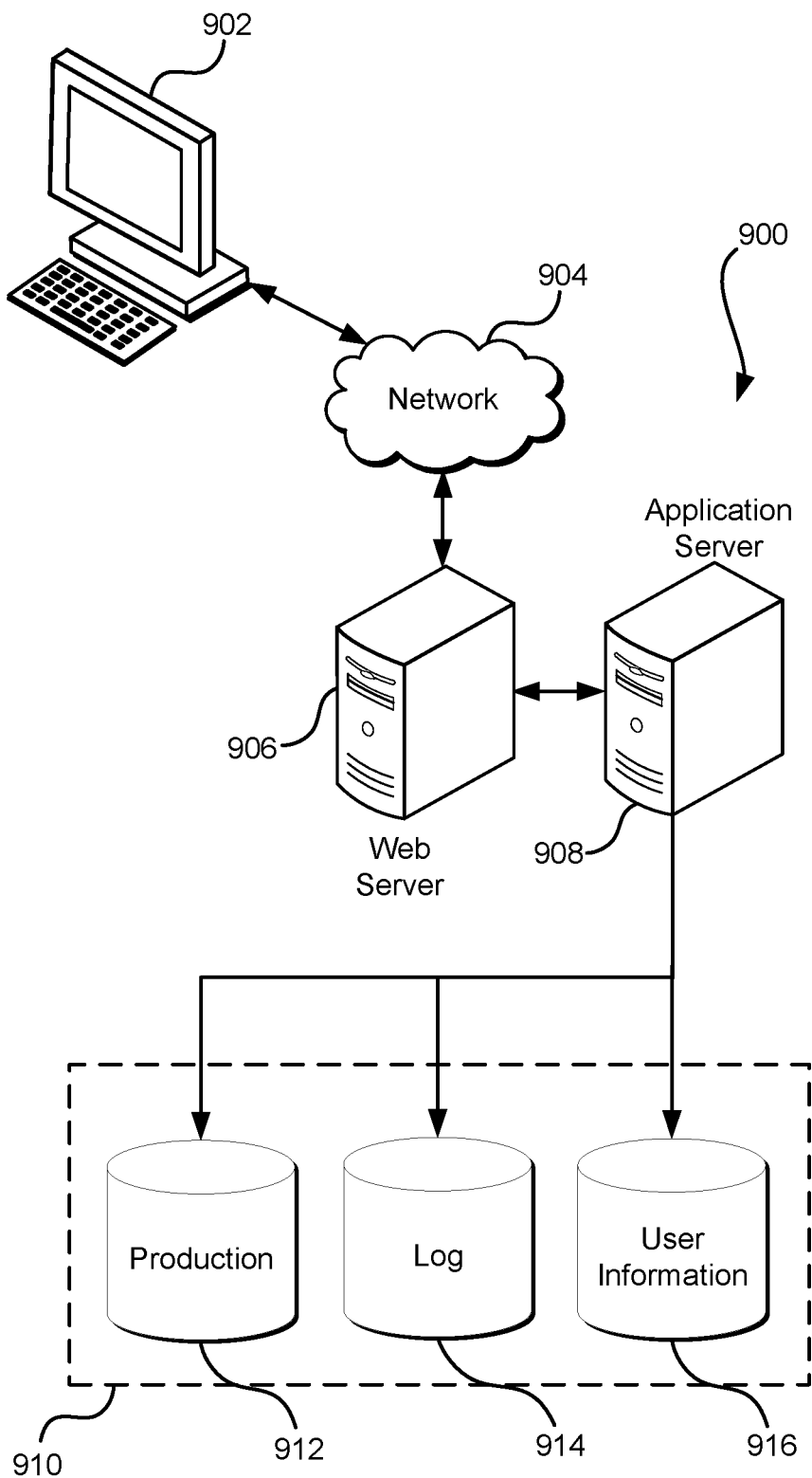
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   providing a principal with a first token comprising a set of security permissions operable to grant access to a plurality of computing resources, wherein the first token includes an expiration and encodes a first mode of operation;
   obtaining, from the principal, a plurality of requests to use the first token to access one or more computing resources of the plurality of computing resources and providing access to the one or more computing resources of the plurality of computing resources in connection with the plurality of requests, access being granted based at least in part on the set of security permissions;

determining, based at least in part on expiration of the first token, a proper subset of the set of security permissions by at least:

identifying the one or more computing resources of the plurality of computing resources accessed as a result of fulfillment of the requests; and selecting the proper subset of the set of security permissions based at least in part on the one or more computing resources identified, wherein the proper subset is sufficient to grant access to the one or more computing resources accessed as a result of fulfillment of the requests;

providing the principal with a second token comprising the proper subset of the set of security permissions, wherein the second token encodes a second mode of operation, further wherein the second mode of operation indicates that the proper subset of the subset of the set of security permissions of the second token is derived from security permissions of an expired token that encodes the first mode of operation;

obtaining, from the principal, a request to use the second token to access a computing resource of the plurality of computing resources; and granting, in response to the request, access to the computing resource of the plurality of computing resources according to the proper subset, access being granted based at least in part on the proper subset.

2. The computer-implemented method of claim 1, further comprising:

denying access to a second computing resource of the plurality of computing resources in connection with a second request using the second token;

providing an indication that access to the second computing resource was denied and that access may be obtained in connection with the set of security permissions;

obtaining a third request from the principal for a third token, wherein the third token comprises the set of security permissions;

fulfilling the third request by providing the third token to the principal; and granting access to the second computing resource in connection with a fourth request using the third token.

3. The computer-implemented method of claim 1, wherein determining the proper subset comprises mapping access to computing resources of the one or more computing resources of the plurality of computing resources to security permissions.

4. The computer-implemented method of claim 1, wherein the expiration included in the first token indicates a baselining period during which the first token is valid.

5. A non-transitory computer-readable storage medium comprising executable instructions that, as a result of being executed by one or more processors of a computer system, cause the computer system to at least:

provide a principal with a first token comprising a set of security permissions operable to grant access to a plurality of computing resources, wherein the first token includes an expiration and encodes a first mode of operation;

obtain, from the principal, a plurality of requests to use the first token to access one or more computing resources of the plurality of computing resources and providing access to the one or more computing resources of the plurality of computing resources in connection with the plurality of requests, access being granted based at least in part on the set of security permissions;

determine, based at least in part on expiration of the first token, a proper subset of the set of security permissions by at least:

identifying the one or more computing resources of the plurality of computing resources accessed as a result of fulfillment of the requests; and selecting the proper subset of the set of security permissions based at least in part on the one or more computing resources identified, wherein the proper subset is sufficient to grant access to the one or more computing resources accessed as a result of fulfillment of the requests;

provide the principal with a second token comprising the proper subset of the set of security permissions, wherein the second token encodes a second mode of operation, further wherein the second mode of operation indicates that the proper subset of the subset of the set of security permissions of the second token is derived from security permissions of an expired token that encodes the first mode of operation;

obtain, from the principal, a request to use the second token to access a computing resource of the plurality of computing resources; and grant, in response to the request, access to the computing resource of the plurality of computing resources according to the proper subset, access being granted based at least in part on the proper subset.

6. The non-transitory computer-readable storage medium of claim 5, wherein the instructions further comprise instructions that, as a result of being executed by the one or more processors, cause the computer system to:

while the proper subset of the set of security permissions are in effect, deny the principal access to a second computing resource of the plurality of computing resources, wherein:

the plurality of computing resources comprises the second computing resource; and the proper subset of the set of security permissions is insufficient to grant access to the second computing resource.

7. The non-transitory computer-readable storage medium of claim 6, wherein the instructions further comprise instructions that, as a result of being executed by the one or more processors, cause the computer system to:

in connection with denying the principal access to the second computing resource, provide an indication that the set of security permissions is sufficient to grant access to the second computing resource; and while the set of security permissions are in effect, grant the principal access to the second computing resource.

8. The non-transitory computer-readable storage medium of claim 5, wherein the instructions to provide the second token to the principal include instruction that, as a result of being executed by the one or more processors, cause the computer system to provide the second token to the principal as a result of the expiration of the first token.

9. The non-transitory computer-readable storage medium of claim 5, wherein at least one computing resource that was not accessed using the first token is included in the set of security permissions and excluded from the proper subset of the set of security permissions.

10. The non-transitory computer-readable storage medium of claim 5, wherein the instructions comprise further instructions that, as a result of being executed by the one or more processors, further cause the computer system to:
store metadata associated with the one or more computing resources of the plurality of computing resources accessed by the principal; and
identify the proper subset of the set of security permissions by at least:
obtaining at least part of the stored metadata; and
mapping the obtained metadata to one or more security permissions, wherein the proper subset of the set of security permissions comprises the one or more security permissions.

11. The non-transitory computer-readable storage medium of claim 10, wherein the metadata associated with the one or more computing resources of the plurality of computing resources accessed by the principal comprises:
a first identifier associated with the principal;
a second identifier associated with a second computing resource of the one or more computing resources of the plurality of computing resources; and
an indication of security permissions exercised in connection with the access of the plurality of computing resources.

12. The non-transitory computer-readable storage medium of claim 5, wherein the expiration is based at least in part on a count limiting how many requests the principal may make to access the plurality of computing resources using the first token.

13. A system, comprising:
one or more processors; and
memory that stores computer-executable instructions that, as a result of execution, cause the one or more processors to:
provide a principal with a first token comprising a set of security permissions operable to grant access to a plurality of computing resources, wherein the first token includes an expiration and encodes a first mode of operation;
obtain, from the principal, a plurality of requests to use the first token to access one or more computing resources of the plurality of computing resources and providing access to the one or more computing resources of the plurality of computing resources in connection with the plurality of requests, access being granted based at least in part on the set of security permissions;
determine, based at least in part on expiration of the first token, a proper subset of the set of security permissions by at least:
identifying the one or more computing resources of the plurality of computing resources accessed as a result of fulfillment of the requests; and
selecting the proper subset of the set of security permissions based at least in part on the one or more computing resources identified, wherein the proper subset is sufficient to grant access to the one or more computing resources accessed as a result of fulfillment of the requests;
provide the principal with a second token comprising the proper subset of the set of security permissions, wherein the second token encodes a second mode of operation, further wherein the second mode of operation indicates that the proper subset of the subset of the set of security permissions of the second token is derived from security permissions of an expired token that encodes the first mode of operation;
obtain, from the principal, a request to use the second token to access a computing resource of the plurality of computing resources; and
grant, in response to the request, access to the computing resource of the plurality of computing resources according to the proper subset, access being granted based at least in part on the proper subset.

14. The system of claim 13, wherein the memory that stores the computer-executable instructions that, as a result of execution, further cause the one or more processors to:
while the proper subset of the set of security permissions are in effect, deny the principal access to a second computing resource of the plurality of computing resources, wherein:
the plurality of computing resources comprises the second computing resource; and
the proper subset of the set of security permissions is insufficient to grant access to the second computing resource.

15. The system of claim 14, wherein the memory that stores the computer-executable instructions that, as a result of execution, further cause the one or more processors to:
in connection with denying the principal access to the second computing resource, provide an indication that the set of security permissions is sufficient to grant access to the second computing resource; and
while the set of security permissions are in effect, grant the principal access to the second computing resource.

16. The system of claim 15, wherein the indication indicates that the second token is sufficient to grant access to the second computing resource.

17. The system of claim 13, wherein after the proper subset of the set of security permissions is in effect for a predetermined period of time, the memory that stores the computer-executable instructions that, as a result of execution, further causes the one or more processors to:
identify a second proper subset of the set of security permissions; and
grant the principal the second proper subset of the second set of security permissions.

18. The system of claim 13, wherein the memory that stores the computer-executable instructions that, as a result of execution, further cause the one or more processors to;
store metadata associated with the one or more computing resources of the plurality of computing resources accessed by the principal; and
identify the proper subset of the set of security permissions by at least:
obtaining at least part of the stored metadata; and
mapping the obtained metadata to one or more security permissions, wherein the proper subset of the set of security permissions comprises the one or more security permissions.

19. The system of claim 18, wherein the metadata associated with the one or more computing resources of the plurality of computing resources accessed by the principal comprises:
a first identifier associated with the principal;
a second identifier associated with a second computing resource of the one or more computing resources of the plurality of computing resources; and
an indication of security permissions exercised in connection with the access of the plurality of computing resources.

20. The system of claim 13, wherein the expiration is based at least in part on a count limiting how many requests the principal may make to access the plurality of computing resources using the first token.

* * * * *